G. HACKLEY.
SHOCK LOADER.
APPLICATION FILED APR. 10, 1917.

1,253,031.

Patented Jan. 8, 1918.
2 SHEETS—SHEET 1.

WITNESSES

INVENTOR
Guy Hackley
BY
ATTORNEYS

G. HACKLEY.
SHOCK LOADER.
APPLICATION FILED APR. 10, 1917.
1,253,031.
Patented Jan. 8, 1918.
2 SHEETS—SHEET 2.
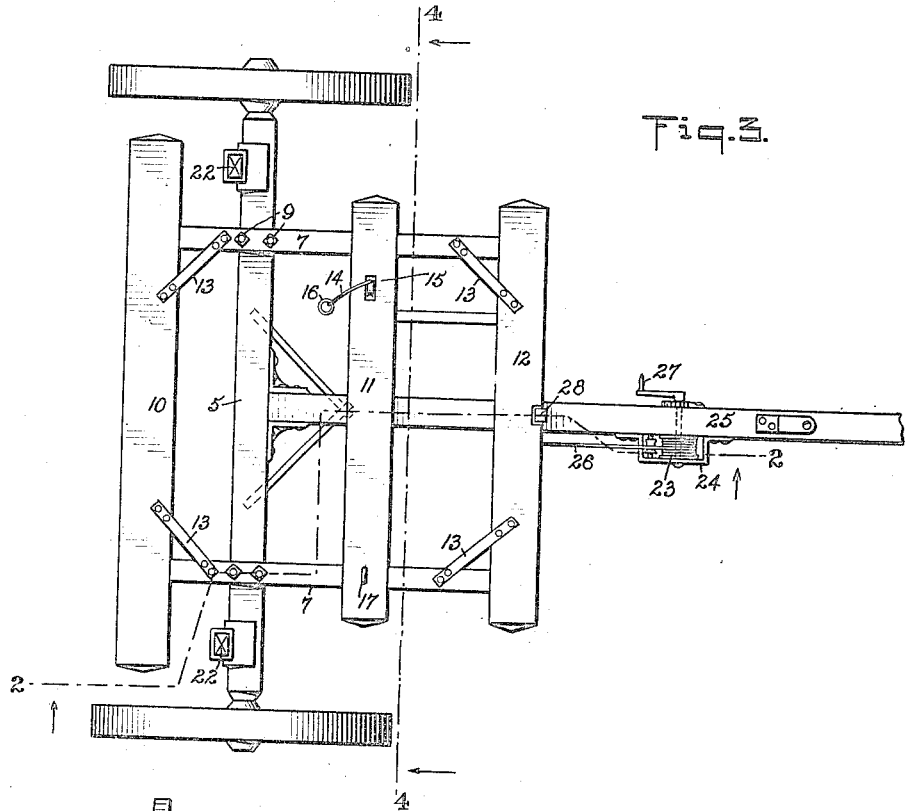
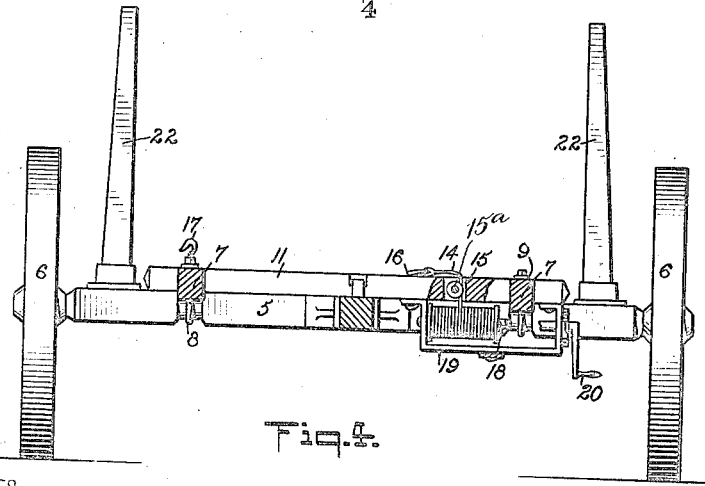
WITNESSES
INVENTOR
Guy Hackley
BY
ATTORNEYS

UNITED STATES PATENT OFFICE.

GUY HACKLEY, OF AHOLT, MISSOURI.

SHOCK-LOADER.

1,253,031. Specification of Letters Patent. Patented Jan. 8, 1918.

Application filed April 10, 1917. Serial No. 160,997.

*To all whom it may concern:*

Be it known that I, GUY HACKLEY, a citizen of the United States, and a resident of Aholt, in the county of Chariton and State of Missouri, have invented a new and Improved Shock-Loader, of which the following is a full, clear, and exact description.

My invention has for its object to provide a shock loader in which the frame is pivoted on an axle which is supported by wheels, means being mounted on the wheels for drawing a shock thereagainst when the frame is in a vertical position, and for holding the shock thereto, and means being mounted on a tongue secured to the axle for moving the frame to a horizontal position.

Additional objects of the invention will appear in the following specification, in which the preferred form of the invention is disclosed.

In the drawings similar reference characters denote similar parts in all the views, in which—

Fig. 3 is a plan view illustrating the invention; and

Fig. 4 is a sectional view on the line 4—4 of Fig. 3.

Figure 1:
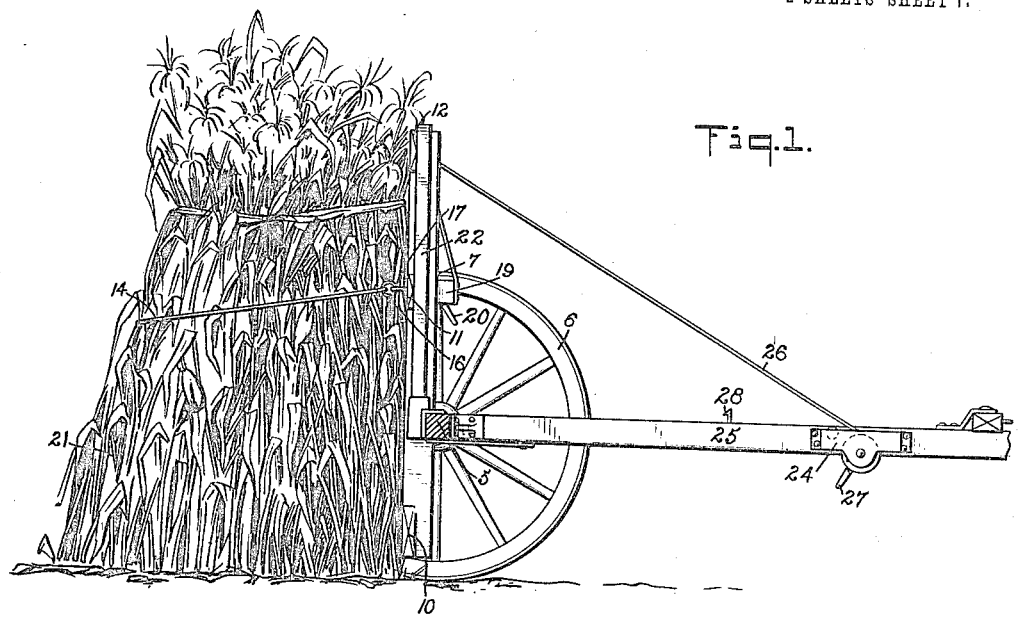
Figure 1 is a sectional side elevation of my invention showing the frame in a vertical position.
Figure 2:
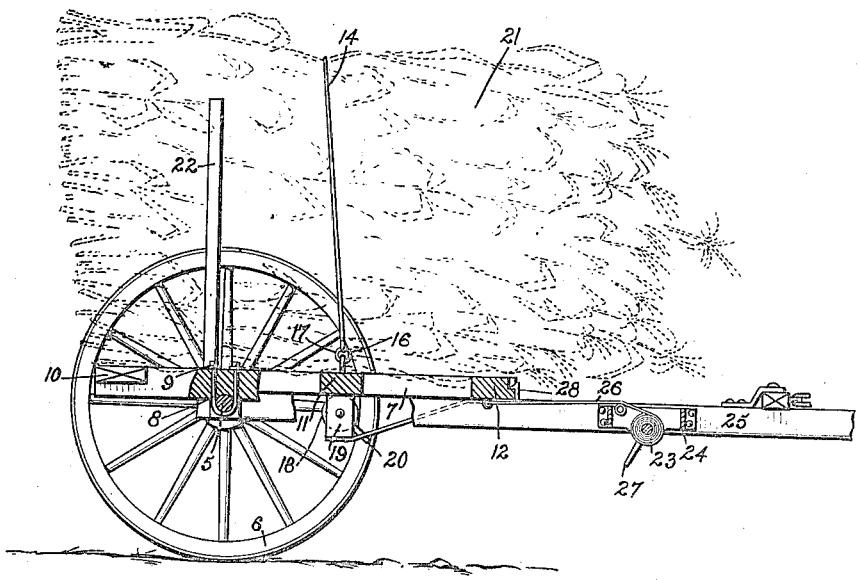
Fig. 2 is a sectional view on the line 2—2 of Fig. 3.

By referring to the drawings, it will be seen that an axle 5 is provided having wheels 6 rotatably mounted on its ends. A frame is disposed over the axle, this frame having members 7 which extend longitudinally of the loader, the frame members 7 being pivoted to the axle 5 by means of U-shaped clamps 8. The terminals of these clamps 8 are threaded and extend upwardly through openings in the frame members 7, nuts 9 being provided for holding the U-shaped clamps 8 in position. The frame members 7 are connected by transverse frame members 10, 11 and 12, braces 13 being disposed obliquely and being secured to the transverse frame members 10 and 12 and to the frame members 7.

The frame mounted on the axle 5 may be tilted backwardly to a vertical position as illustrated in Fig. 1 of the drawings, when a rope 14, which extends upwardly through an opening 15 at one side of the transverse frame member 11, may be disposed around a shock, this rope 14 having a ring 16 which may be disposed over a hook 17 which is secured to the other side of the transverse frame member 11. When this has been done a windlass 18 which is mounted on a bracket 19 secured to the under side of the transverse frame member 11, may be turned by means of a crank 20 to draw the rope 14 taut, thereby binding the shock 21 against the frame, so that when the frame is moved again to horizontal or normal position, the shock will be raised from the ground and deposited over the axle. Secured to the axle 5 and extending upwardly one at each side of the frame there are posts 22, these posts remaining in vertical position when the frame is rotated rearwardly, the function of these posts being to prevent the shock from coming into engagement with the wheels 6. A pulley 15ª is rotatably mounted in the opening 15 over which the rope 14 is disposed.

As a means of rotating the frame with one or more shocks from a vertical position to normal position, I provide a windlass 23 mounted on a bracket 24 and secured to the side of a tongue 25 which is in turn secured to the axle 5 and extends forwardly therefrom. A rope 26 is secured to the under side of the transverse frame member 12, and leads to the windlass 23, which is turned by a crank 27. It will be understood that one crank may serve for the two windlasses, it being possible to remove this crank, and use it on the windlass which is to be operated.

When using my shock loader, I have found it advisable to secure the shock or shocks to the frame when the frame is in a vertical position, in the manner which has been described, and after this has been done, to operate the windlass 23 until the rope 26 is taut, after which draft animals secured to the loader are started, to free the shock or shocks from the ground. When this has been done, the windlass 23 is operated to move the frame to horizontal, which is its normal position. The transverse frame member 12 is normally secured to the tongue 25 by means of a catch 28.

Having thus described my invention, I claim as new and desire to secure by Letters Patent:

1. In a shock loader, a transverse axle, wheels on the axle, a frame, two U-shaped members disposed around the axle with their terminals secured to the frame, the distance between the axle and the rear of the frame being less than the distance between the axle and the periphery of the wheels so that the frame may be rocked rearwardly, downwardly and forwardly to a horizontal position under the axle, two posts secured to the axle one at each side of the frame, a tongue secured to the axle and extending forwardly therefrom, and means to bind the shock to the frame and to move the frame relatively to the axle.

2. In a shock loader, a transverse axle for supporting wheels, a frame pivoted to the axle and free to rotate 180° thereon, the distance between the axle and the rear of the frame being less than the distance between the axles and the periphery of the wheels so that the frame may be rocked rearwardly, downwardly and forwardly to a horizontal position under the axle, means on the frame for drawing a shock thereto, a tongue secured to the axle and extending forwardly therefrom, and means connected with the tongue for moving the frame relatively to the axle.

3. In a shock loader, an axle having supporting wheels, a frame, two U-shaped members disposed around the axle with their terminals secured to the frame, the distance between the axle and the rear of the frame being less than the distance between the axles and the periphery of the wheels so that the frame may be rocked rearwardly, downwardly and forwardly to a horizontal position under the axle, a windlass mounted on the frame, a rope secured to the windlass, and having an end which may be disposed around a shock when the frame is tilted rearwardly, the rope being adapted to be secured to the frame so that when the windlass is operated the shock will be bound to the frame, a tongue secured to and extending forwardly from the axle, and means secured to the frame and including a windlass mounted on the tongue for moving the frame relatively to the axle.

GUY HACKLEY.

Copies of this patent may be obtained for five cents each, by addressing the "Commissioner of Patents, Washington, D. C."